United States Patent
Numakura et al.

(10) Patent No.: US 12,409,883 B2
(45) Date of Patent: Sep. 9, 2025

(54) ELECTRIC POWER STEERING DEVICE

(71) Applicant: Mitsubishi Electric Corporation, Tokyo (JP)

(72) Inventors: Akio Numakura, Tokyo (JP); Hideki Doi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 139 days.

(21) Appl. No.: 17/921,673

(22) PCT Filed: May 29, 2020

(86) PCT No.: PCT/JP2020/021270
§ 371 (c)(1),
(2) Date: Oct. 27, 2022

(87) PCT Pub. No.: WO2021/240758
PCT Pub. Date: Dec. 2, 2021

(65) Prior Publication Data
US 2023/0159091 A1    May 25, 2023

(51) Int. Cl.
*B62D 5/04*     (2006.01)
*B62D 15/02*    (2006.01)

(52) U.S. Cl.
CPC ........... *B62D 5/046* (2013.01); *B62D 5/0496* (2013.01); *B62D 15/0285* (2013.01)

(58) Field of Classification Search
CPC ... B62D 5/046; B62D 5/0496; B62D 15/0285
See application file for complete search history.

(56) References Cited

U.S. PATENT DOCUMENTS

2016/0101813 A1* 4/2016 Ishijima .................. B62D 5/04
                                                         701/41
2016/0167702 A1  6/2016 Morimoto et al.
(Continued)

FOREIGN PATENT DOCUMENTS

JP    2006168428     *  6/2006
JP    2009-190531 A    8/2009
(Continued)

OTHER PUBLICATIONS

Office Action issued Sep. 19, 2023 in Japanese Application No. 2022-527424.
(Continued)

*Primary Examiner* — Joan T Goodbody
*Assistant Examiner* — Godfrey Aleksander Maciorowski
(74) *Attorney, Agent, or Firm* — Sughrue Mion, PLLC

(57) ABSTRACT

This electric power steering device is provided with a function for: notifying a parking assistance device of a statically-steerable upper limit number obtained from an estimated motor current when static steering is performed in turnabout and a current limit value for the purpose of overheat protection of an electric power steering; and notifying the parking assistance device of whether the electric power steering can perform steering according to a target steering angle command, from a target steering angle and a target vehicle speed from the start of parking to the completion thereof, thus preventing interruption due to overheat of the electric power steering during parking assistance.

7 Claims, 7 Drawing Sheets

(56) References Cited

U.S. PATENT DOCUMENTS

2016/0185389 A1* 6/2016 Ishijima ............ B62D 15/0285
                                                                701/41
2016/0375933 A1    12/2016 Hiei et al.

FOREIGN PATENT DOCUMENTS

| JP | 2010-228591 A | 10/2010 |
| JP | 2015-003565 A | 1/2015 |
| JP | 6079596 B2 | 2/2017 |
| JP | 2019-123276 A | 7/2019 |
| JP | 2019-130994 A | 8/2019 |
| WO | 2015/011996 A1 | 1/2015 |

OTHER PUBLICATIONS

Communication dated Jan. 24, 2023, issued in Indian Application No. 202227058869.
International Search Report of PCT/JP2020/021270 dated Jul. 28, 2020 [PCT/ISA210].
Extended European Search Report dated Jun. 15, 2023 in Application No. 20938402.3.
Office Action issued Jul. 4, 2023 in Japanese Application No. 2022-527424.
Office Action issued Jun. 14, 2025 in Chinese Patent Application No. 202080101080.3.

* cited by examiner

ELECTRIC POWER STEERING DEVICE

CROSS REFERENCE TO RELATED APPLICATIONS

This application is a National Stage of International Application No. PCT/JP2020/021270, filed May 29, 2020.

TECHNICAL FIELD

The present disclosure relates to an electric power steering device.

BACKGROUND ART

In a system that performs automatic parking of a vehicle, it has been known that, when a vehicle stops at a turnabout position and performs turnabout, static steering is performed to turn a steering wheel while the vehicle is stopped. Applying an excessive load on an Electric Power Steering (EPS), the static steering is likely to cause the EPS to be overheated. To prevent overheat damage of the EPS, currents need to be limited and overheat protection needs to be performed.

To solve these problems, there is a method of estimating the necessary number of static steering and, so as not to cause overheat protection to start unexpectedly during parking assistance, notifying a driver of the estimated number before the start of overheat protection (see Patent Document 1). Alternatively, after static steering has been performed and then the vehicle has been advanced, the steering direction is changed at a stage slightly earlier than when next static steering is performed. In this way, a static steering amount is reduced (see Patent Document 2). In addition, there is still another method of determining one route including static steering and another route not including static steering, and the static steering amount, depending on the temperature of the EPS (see Patent Document 3).

CITATION LIST

Patent Document

Patent Document 1: Japanese Laid-Open Patent Publication No. 2009-19051
Patent Document 2: Japanese Laid-Open Patent Publication No. 2015-3565
Patent Document 3: Japanese Patent No. 6079596

SUMMARY OF THE INVENTION

Problems to be Solved by the Invention

In a method disclosed in Patent Document 1, limitation or cancellation of parking assistance by overheat protection cannot be prevented.

In a method disclosed in Patent Document 2, after static steering has been performed and then the vehicle has been advanced, the direction is changed into the next steering direction at the stage earlier than usual, thereby reducing the steering angle for performing static steering. However, since a load state of a steering device is not detected, even if parking involving static steering by the steering device is sufficiently possible, a vehicle is parked through the route for reducing the static steering amount. Thus, the number of turnabouts until the completion of parking may be increased.

In a method disclosed in Patent Document 3, presence/absence of static steering is determined at the place for turnabout, on the basis of the temperature of the EPS. Accordingly, another route needs to be regenerated during parking control. The route different from the route initially set is to be used, thereby increasing the amount of steering until the completion of parking. Furthermore, a motor may be overheated due to the increased steering amount, and thus automatic parking may be interrupted.

The present disclosure has been made to solve the above problems, and an object of the present disclosure is to provide an electric power steering device that can avoid a steering disabled state and cancellation of parking assistance caused by an overheated motor during parking control and that allows parking control even in an overheat condition of the motor.

Solution to the Problems

An electric power steering device according to the present disclosure includes: route generation means for generating a route for driving from an own vehicle position to a target parking position; calculation command means for calculating a target steering angle command for causing a vehicle to drive along the route generated by the route generation means; an automatic steering control unit for calculating motor current for causing a steering angle to be formed according to the target steering angle command; an overheat protection current limit unit for calculating an overheat protection current limit value from the motor current; and a statically-steerable number determination unit for calculating a statically-steerable upper limit number on the basis of the overheat protection current limit value.

Effect of the Invention

Such an electric power steering device disclosed in the present disclosure can avoid a steering disabled state and cancellation of parking assistance caused by an overheated motor during parking control, and allows parking control even in an overheat condition of the motor.

DESCRIPTION OF EMBODIMENTS

Figure 1:
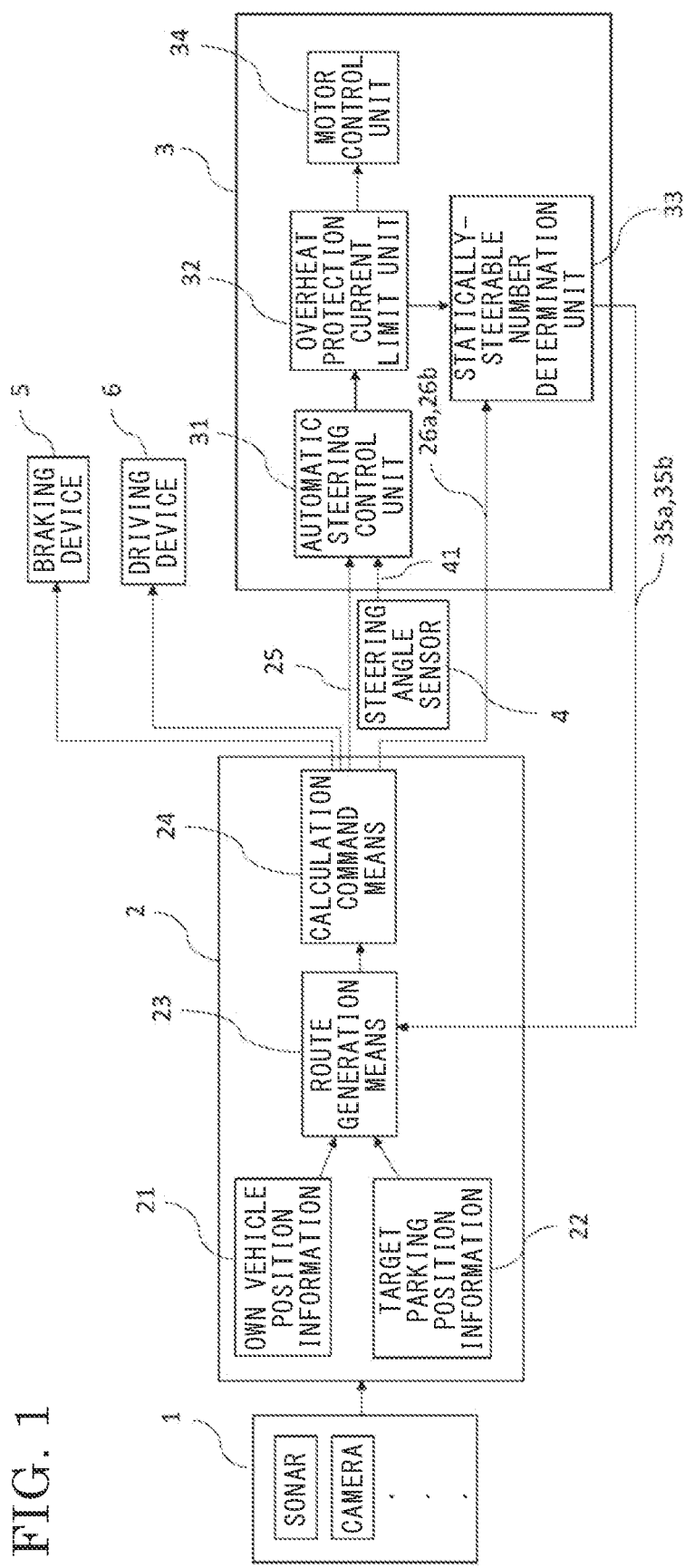
FIG. 1 is a schematic configuration diagram of an electric power steering device according to embodiment 1.

Hereinafter, an electric power steering device according to preferred embodiments for carrying out the present disclosure will be described in detail with reference to the drawings. In the drawings, the same reference characters denote the same or corresponding parts, and detailed description thereof will be omitted. Also in the subsequent embodiments, repeated description of components denoted by the same reference characters will be omitted in the same manner.

Embodiment 1

FIG. 1 is a schematic configuration diagram of an electric power steering device according to embodiment 1. The electric power steering device includes, as main components, a surrounding environment sensor group 1, a parking assistance device 2, an electric power steering (EPS) 3, and a steering angle sensor 4.

As the surrounding environment sensor group 1, a camera and sonar for monitoring the front, rear, or sides of a vehicle, a marker sensor for detecting markers in a parking lot, a GPS device for obtaining GPS information, a reception device for receiving map data in a parking lot, and the like are mounted in a vehicle. These sensors or devices detect condition information of the vehicle itself and surrounding information thereof. The information is transmitted to the parking assistance device 2 through a communication line of the vehicle such as a communication line of a Controller Area Network (CAN).

The parking assistance device 2 is a device for performing so-called automatic parking, and for outputting a command for changing vehicle behavior by using various information from the surrounding environment sensor group 1.

The parking assistance device 2 includes: route generation means 23 for receiving information from the surrounding environment sensor group 1, calculating own vehicle position information 21 and target parking position information 22, and generating a route to a target parking position; and calculation command means 24 for calculating a signal for a control command on the basis of output from the route generation means 23. Output from the calculation command means 24 is outputted to control the electric power steering (EPS) 3, a braking device 5, and a driving device 6.

In detail, the route generation means 23 detects, for example, a distance to a vehicle located to the front, rear, or side, lanes, a parking frame line, an obstacle, and the like, on the basis of information from the camera of the surrounding environment sensor group 1. From among the information, map information in a parking lot, OPS information, and the like, the route generation means 23 selects information necessary for performing parking control. On the basis of the selected information, the route generation means 23 calculates the own vehicle position information 21 and the target parking position information 22, and generates a route from an own vehicle position to a target parking position.

The calculation command means 24 calculates the target steering angle command 25 needed from the own vehicle position to the target parking position, according to route information generated by the route generation means 23, and outputs the target steering angle command 25 to the electric power steering (EPS) 3. In addition, the calculation command means 24 calculates and outputs an acceleration and deceleration command to the driving device 6 and a braking command to the braking device 5. For example, the calculation command means 24 issues commands, such as accelerating so as to travel along a route, steering to cause the vehicle to park between parking vehicles, braking wheels to cause the vehicle to stop at a vehicle stop position according to a route, and the like. That is, commands for performing vehicle speed control needed until the completion of parking are outputted to the electric power steering (EPS) 3, the braking device 5, and the driving device 6.

Furthermore, the calculation command means 24 calculates a target steering angle 26a and a target vehicle speed 26b needed from an own vehicle position to a target parking position. The difference between the target steering angle command 25 and the target steering angle 26a described above is as follows.

The target steering angle command 25 is a target steering angle needed for the calculation command means 24 to operate the vehicle according to the route generated by the route generation means 23, and is a command to be performed in real time. Meanwhile, the target steering angle 26a refers to all steering to be performed by the calculation command means 24 until the completion of parking along the route generated by the route generation means. The target steering angle 26a refers to all the steering, but also refers to reduced data thereof with contents limited to only specific points, such as the place where turnabout is performed, because the data amount for all the time-series data is enormous.

The electric power steering (EPS) 3 includes an automatic steering control unit 31, an overheat protection current limit unit 32, a statically-steerable number determination unit 33, and a motor control unit 34 that outputs motor current according to a target current.

The automatic steering control unit 31 receives the target steering angle command 25 from the parking assistance device 2 and steering angle information 41 from the steering angle sensor 4, and calculates a motor target current needed for steering according to the target steering angle.

The overheat protection current limit unit 32 limits the target current by using an overheat protection current limit value Y calculated from a motor current amount of the electric power steering (EPS) 3, to prevent damage due to overheat of the electric power steering (EPS) 3. That is, the overheat protection current limit value Y is a maximum current value of current that can flow through the motor at present, to prevent the motor from damaging itself.

Figure 2:
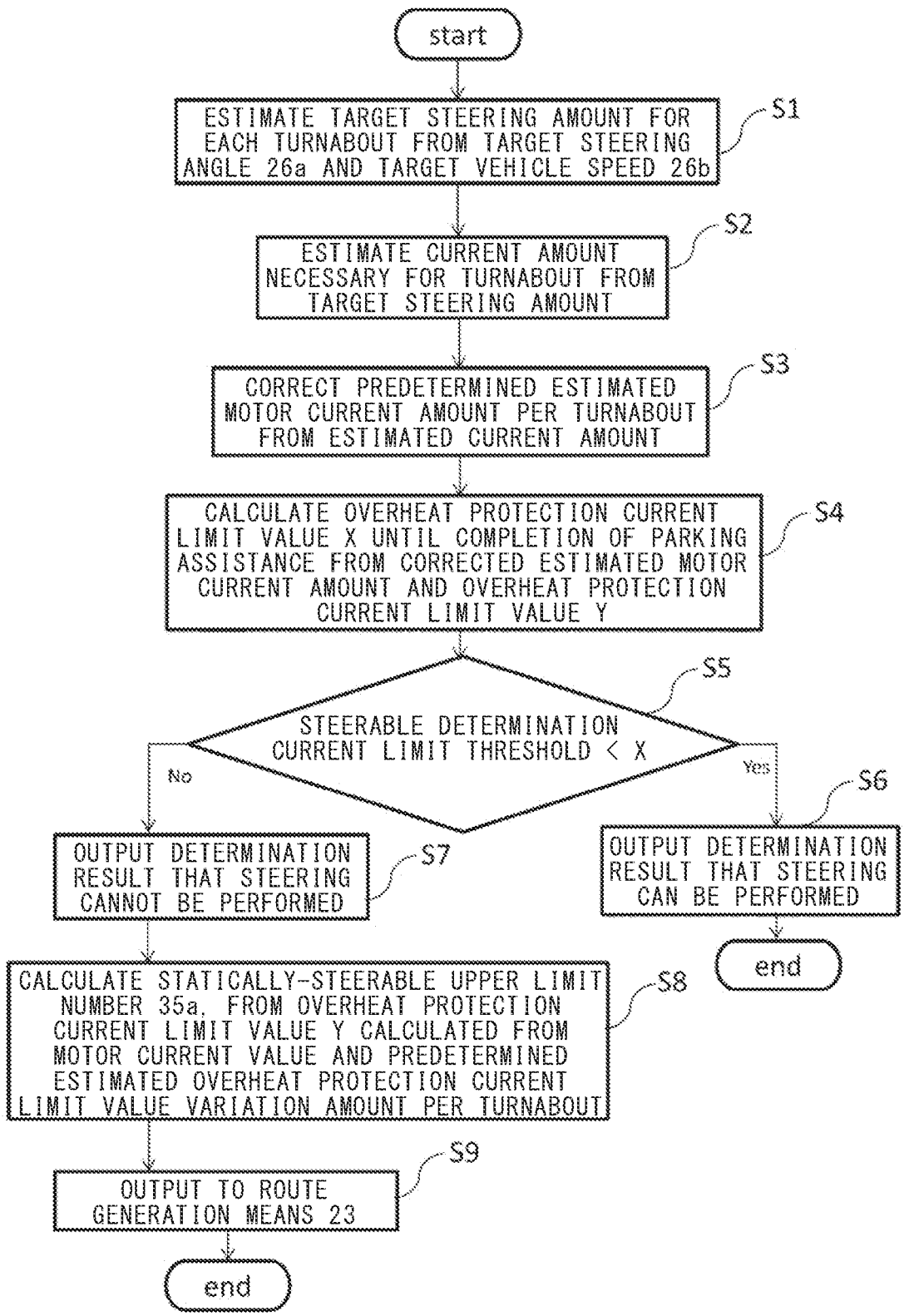
FIG. 2 is a flowchart illustrating operation of a statically-steerable number determination unit according to embodiment 1.

With reference to a flowchart in FIG. 2, behavior of the statically-steerable number determination unit 33 of embodiment 1 will be described.

The statically-steerable number determination unit 33 estimates a target steering amount for each turnabout, from the target steering angle 26a and the target vehicle speed 26b inputted from the calculation command means 24 of the parking assistance device 2 and needed from an own vehicle position to a target parking position (step S1). Here, the target steering angle 26a to be inputted need not be all time-series data until the completion of parking assistance, and may be data only at each timing of performing turnabout with great change to the target steering angle.

On the basis of the target vehicle speed 26b, whether or not operation is static steering can be determined, and thus, the current amount necessary for turnabout can be estimated from the target steering amount, which is a variation amount of the target steering angle 26a (step S2). A predetermined estimated motor current amount per turnabout is corrected by using the estimated current amount (step S3). An overheat protection current limit value X to be used until the completion of parking assistance is calculated, from the corrected estimated motor current amount and the above overheat protection current limit value Y (step S4). This calculation is the same as that for the overheat protection current limit value Y to be calculated from the motor current amount in the overheat protection current limit unit 32, but is performed using the corrected estimated motor current amount instead of the motor current amount. That is, the overheat protection current limit value X to be used until the completion of parking assistance is a maximum current value of current that can flow through the motor, calculated from the estimated current amount until the completion of parking. Since the motor is overheated when the current flows, the overheat protection current limit value X is a value that basically decreases depending on the corrected estimated motor current amount.

When the overheat protection current limit value X until the completion of parking assistance exceeds a predetermined steerable determination current limit threshold (a minimum motor current value needed until parking has been completed) (step S5), a fact that steering can be performed at the inputted target steering angle 26a is outputted as a determination result of a parking possibility determination 35b (step S6).

On the other hand, when the overheat protection current limit value X is not greater than the steerable determination current limit threshold, a fact that steering cannot be performed at the inputted target steering angle is our as a result of the parking possibility determination 35b (step S7). Then, a statically-steerable upper limit number 35a is calculated, from the overheat protection current limit value Y and a predetermined estimated overheat protection current limit value variation amount per turnabout with static steering (step S8). Here, the statically-steerable upper limit number 35a is the number of times of turnabouts with static steering allowable until a predetermined statically-steerable determination current limit threshold is reached. The statically-steerable upper limit number 35a is outputted to the route generation means 23 of the parking assistance device 2 (step S9).

In this case, the statically-steerable upper limit number 35a may be obtained through a map generated from a relationship between the overheat protection current limit value Y, the predetermined statically-steerable determination current limit threshold, and the estimated overheat protection current limit value variation amount per turnabout with static steering.

Alternatively, a gain depending on the target steering angle variation amount inputted in advance is added to the predetermined estimated overheat protection current limit value variation amount per turnabout with static steering, and the obtained value may be used for the calculation as well.

In this case, whether or not a load of the electric power steering (EPS) 3 in the route generated by the route generation means 23 is within an acceptable range can be checked, thereby preventing automatic parking control from being interrupted during automatic parking control due to the electric power steering (EPS) 3 being in a high-load condition. Furthermore, even if it is determined that steering cannot be performed, the statically-steerable upper limit number 35a is outputted to the route generation means 23, and thus the route generation means 23 can add the statically-steerable upper limit number 35a as a condition to regenerate a more feasible route.

According to the present embodiment, as described above, whether or not the electric power steering (EPS) 3 is in an overheat condition and whether or not the scheduled parking assistance can be performed are determined. Even when the electric power steering (EPS) 3 is in an overheat condition, the statically-steerable number is determined in consideration of a load of the electric power steering (EPS) 3, and thus the parking assistance device can be notified of information necessary for calculation of a feasible parking route. Therefore, a shorter route in which parking is performed than a parking route in which static steering is not performed can be calculated, even when the motor is in an overheat condition.

Embodiment 2

Figure 3:
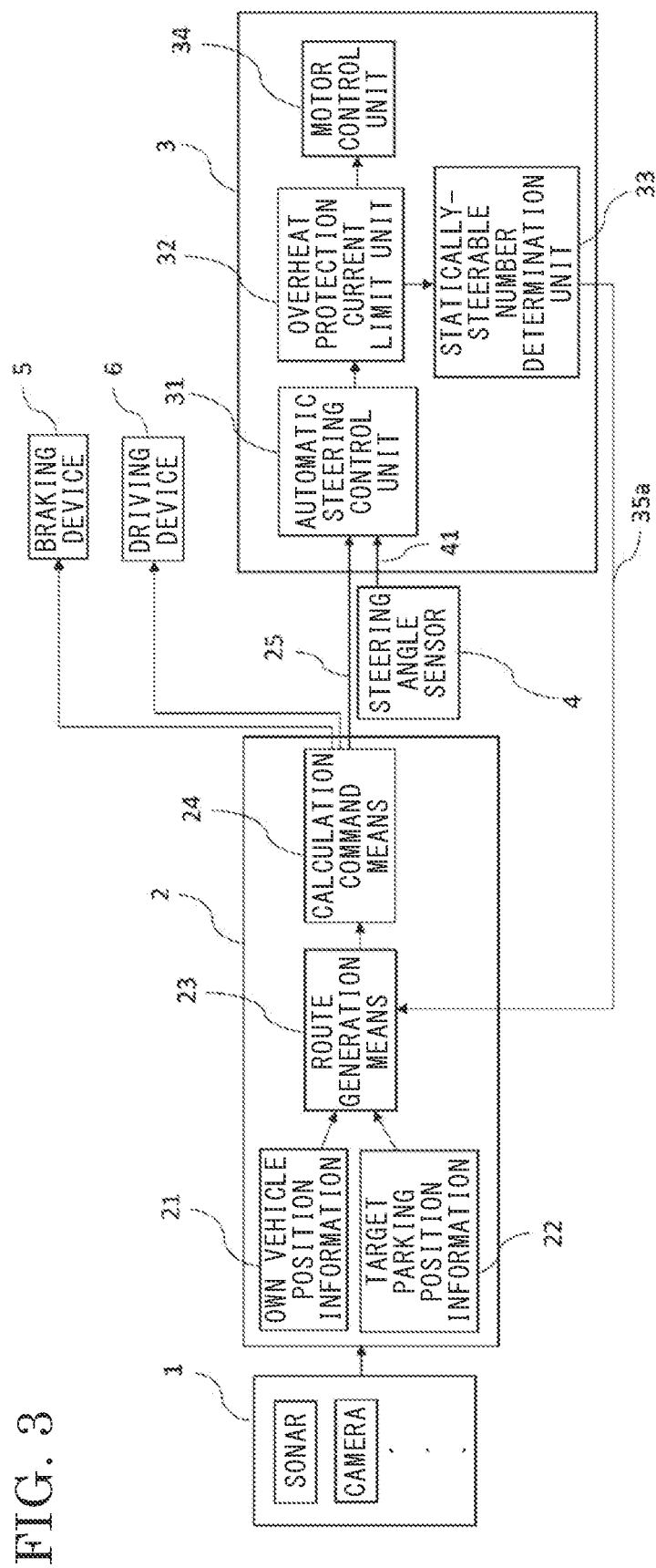
FIG. 3 is a schematic configuration diagram of an electric power steering device according to embodiment 2.

A configuration of an electric power steering device according to embodiment 2 is basically not different from that of embodiment 1, but input and output signals for the parking assistance device 2 and the electric power steering (EPS) 3 are different. FIG. 3 is a schematic configuration diagram of the electric power steering device according to embodiment 2. That is, in embodiment 1, control is performed in a state in which steering to be performed has been recognized in advance, whereas in embodiment 2, control is performed in a state in which steering to be performed has not been recognized in advance.

With such difference between the states to be a precondition for control, the target steering angle 26a and the target vehicle speed 26b needed from an own vehicle position to a target parking position, which are outputted from the calculation command means 24 to the statically-steerable number determination unit 33 in embodiment 1, need not be outputted in embodiment 2. Furthermore, the parking possibility determination 35b which is outputted from the statically-steerable number determination unit 33 in embodiment 1 need not be outputted in embodiment 2.

In embodiment 2, route generation means 23 detects, for example, a distance to a vehicle located to the front, rear, or side, lanes, a parking frame line, an obstacle, and the like, on the basis of information from a camera of a surrounding environment sensor group 1. From among the information, map information in a parking lot, GPS information, and the like, the route generation means 23 selects information necessary for performing parking control.

Furthermore, on the basis of the selected information, the route generation means 23 calculates own vehicle position information 21 and target parking position information 22. A statically-steerable upper limit number 35a, which is outputted from the electric power steering (EPS) 3, is added as a condition, and as a route from an own vehicle position to a target parking position, a parking route in which static steering is performed within the statically-steerable upper limit number 35a is generated. In this case, turnabout in which static steering is not performed may be included.

Calculation command means 24 calculates a target steering angle command 25 needed from the own vehicle position to the target parking position, according to information, generated by the route generation means 23, on a parking route in which static steering is performed, and outputs the target steering angle command 25 to the electric power steering (EPS) 3. In addition, the calculation command means 24 calculates and outputs an acceleration and deceleration command to a driving device 6 and a braking command to a braking device 5. For example, the calculation command means 24 issues commands, such as accelerating so as to travel along a route, steering to cause the vehicle to park between parking vehicles, braking wheels to cause the vehicle to stop at a vehicle stop position according to a route, and the like.

Figure 4:
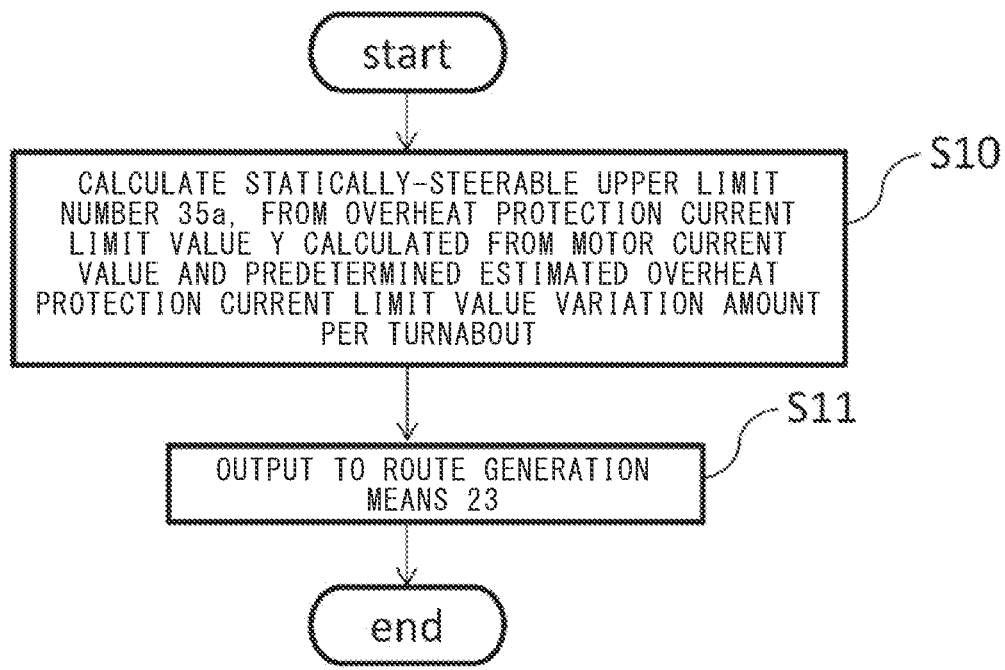
FIG. 4 is a flowchart illustrating behavior of a statically-steerable number determination unit according to embodiment 2.

As shown in a flowchart illustrated in FIG. 4, a statically-steerable number determination unit 33 calculates a statically-steerable upper limit number 35a, from an overheat protection current limit value Y calculated from a motor current amount of the electric power steering (EPS) 3 in an overheat protection current limit unit 32, and a predetermined estimated overheat protection current limit value variation amount per turnabout with static steering (step S10). Here, the statically-steerable upper limit number 35a is the number of times of turnabout with static steering allowable until a predetermined statically-steerable determination current limit threshold is reached. The statically-steerable upper limit number 35a is outputted to the route generation means 23 of a parking assistance device 2 (step S11).

In this case, the statically-steerable upper limit number 35a may be obtained through a map generated from a relationship between the overheat protection current limit value Y, the predetermined statically-steerable determination current limit threshold, and the estimated overheat protection current limit value variation amount per turnabout with static steering.

In embodiment 2, a load condition of the electric power steering (EPS) 3 using a motor is not used at the time of generation of a route or calculation of commands, such as a target steering angle command, an acceleration and deceleration command, a braking command, and the like, each of which is processing of the parking assistance device 2. That is, since steering to be performed has not been recognized in advance, a load condition cannot be considered. Therefore, if the electric power steering (EPS) 3 falls into a steering disabled state during parking assistance due to overheat protection, it is necessary for a driver to take over the steering halfway through parking control. However, being in a high-load condition, the electric power steering (EPS) 3 cannot sufficiently perform steering assistance, that is, assistance to a driver's steering to be usually performed.

In this case, the statically steerable upper limit number 35a is sent from the electric power steering (EPS) 3 to the route generation means 23, whereby feasibility of driving assistance can be ensured. The electric power steering (EPS) 3 outputs, from the statically-steerable number determination unit 33, information on the number of times that the vehicle can perform turnabout with static steering during which the electric power steering (EPS) 3 may fall into a high-load condition, to the route generation means 23.

In this case, since the electric power steering (EPS) 3 notifies the route generation means 23 of the statically-steerable upper limit number 35a and a route is calculated before the start of parking operation, a route with a shorter vehicle movement distance can be generated, compared to a case where turnabout without static steering is performed after the electric power steering (EPS) 3 is detected to be in a high-load condition. For example, during parallel parking control in which a vehicle can perform static steering only twice due to the electric power steering (EPS) 3 being in a high load condition, steering without static steering is performed first, and then turning back with static steering is performed when a vehicle is driven between a front vehicle and a rear vehicle in parallel parking and when final turnabout is performed so as to align a parking direction between the vehicles within a limited vehicle-movable space. Thus, a route with a consequently shorter vehicle movement distance can be generated.

Embodiment 3

Figure 5:
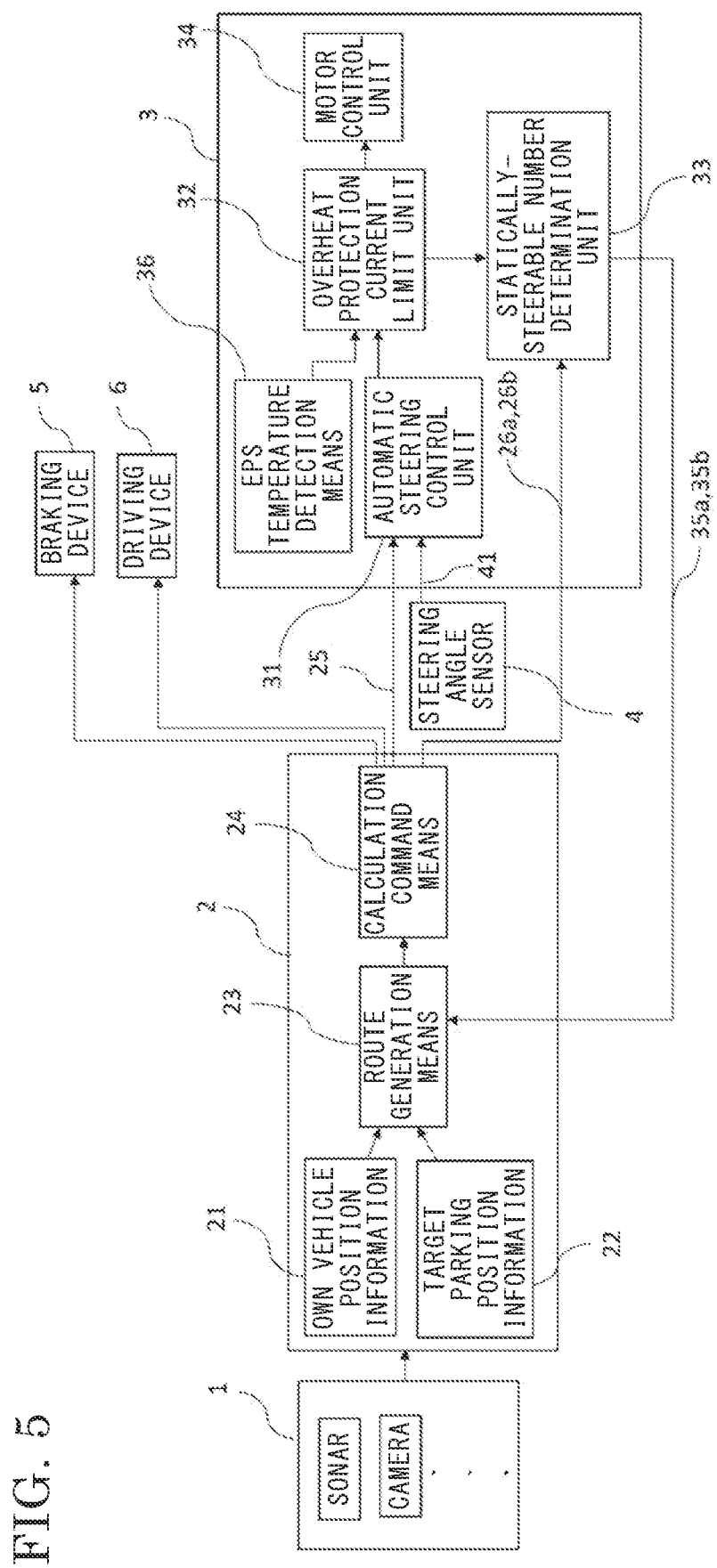
FIG. 5 is a schematic configuration diagram of an electric power steering device according to embodiment 3.
Figure 6:
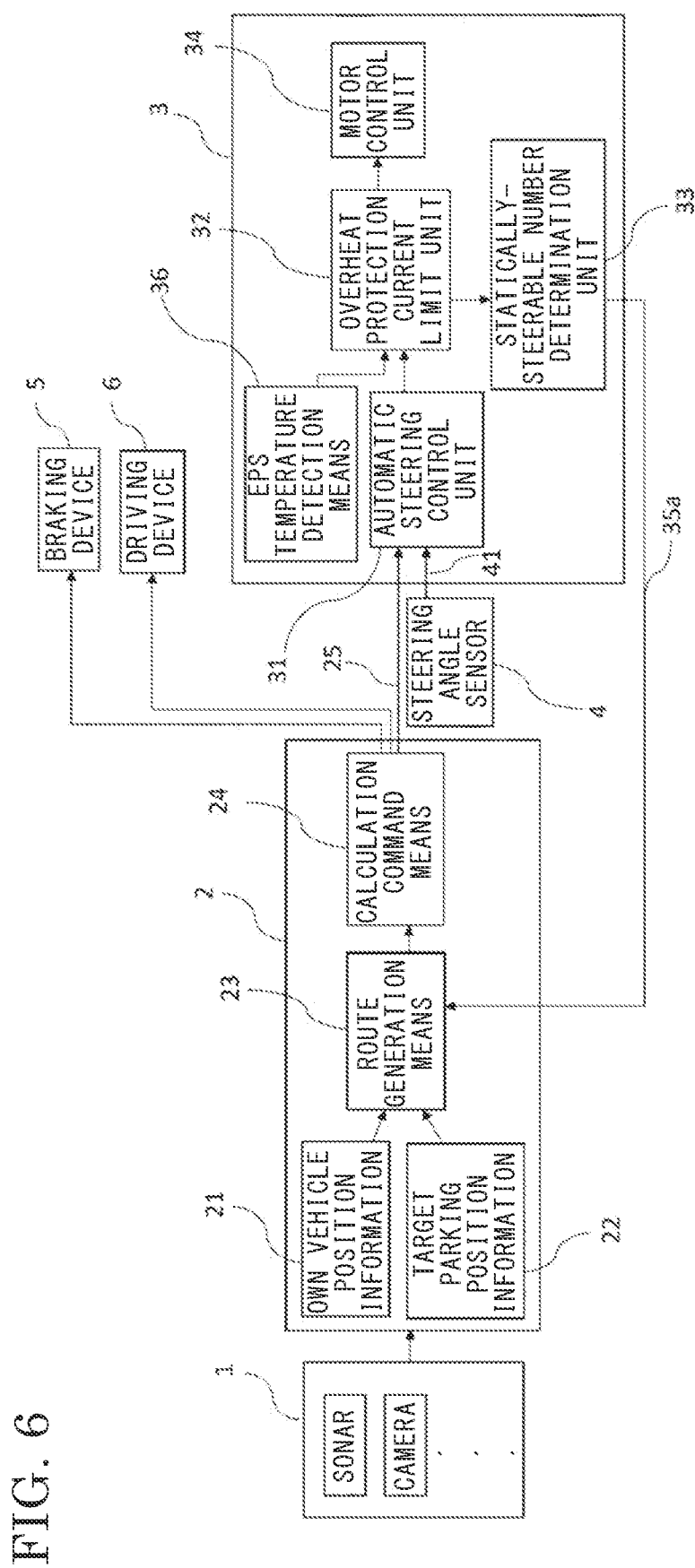
FIG. 6 is another schematic configuration diagram of the electric power steering device according to embodiment 3.

Embodiment 3 will be described with reference to FIG. 5 or FIG. 6. An electric power steering (EPS) 3 in embodiment 3 is different from embodiment 1 or embodiment 2 in that the electric power steering (EPS) 3 in embodiment 3 includes EPS temperature detection means, and a method for calculating an overheat protection current limit value in an overheat protection current limit unit 32 is also different as below.

In embodiment 1 or embodiment 2, the overheat protection current limit value is calculated solely from the motor current amount. However, the overheat protection current limit unit 32 of the electric power steering (EPS) according to embodiment 3 calculates the overheat protection current limit value from an EPS temperature from an EPS temperature detection means 36, and a motor current amount. This EPS temperature may indicate any of temperatures of heat generation components, such as a motor of the electric power steering (EPS) 3, a Field Effect Transistor (FET) mounted in an Electric Control Unit (ECU) of the electric power steering (EPS) 3, and the like, constituting the electric power steering (EPS) 3.

The EPS temperature detection means 36 enables more accurate calculation of the overheat protection current limit value according to temperature characteristics for each EPS component.

Figure 7:
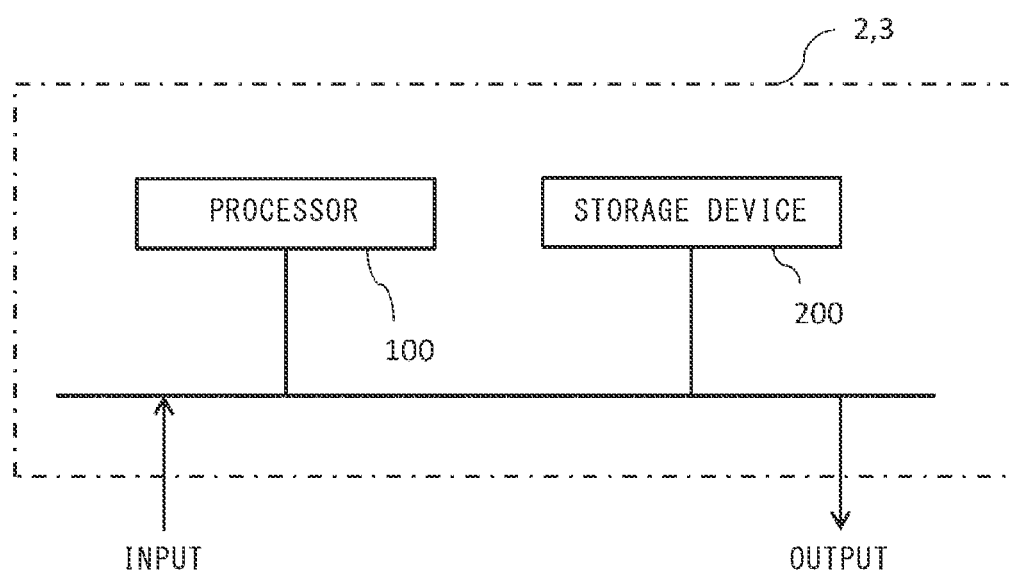
FIG. 7 is an example of a hardware configuration diagram of the electric power steering device according to each of embodiments 1 to 3.

In FIG. 7, an example of a hardware configuration mounted in a parking assistance device 2 and the electric power steering (EPS) 3 is shown. The parking assistance device 2 and the electric power steering (EPS) 3 include a processor 100 and a storage device 200. Although not shown, the storage device includes a volatile storage device such as a random access memory and a non-volatile auxiliary storage device such as a flash memory. The storage device 200 may also include an auxiliary storage device of a hard disk instead of the flash memory. The processor 100 executes a program inputted from the storage device 200 to perform processing of, for example, the route generation means 23, the calculation command means 24, the automatic steering control unit 31, the statically-steerable number determination unit 33, or the like. In this case, the program is inputted into the processor 100 from the auxiliary storage device via the volatile storage device. The processor 100 may also output data such as a calculation result to the volatile storage device of the storage device 200, or may store data into the auxiliary storage device via the volatile storage device. A plurality of the processors 100 and the storage devices 200 may be provided.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the disclosure. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 surrounding environment sensor group
2 parking assistance device
3 electric power steering (EPS)
4 steering angle sensor
23 route generation means 24 calculation command means
25 target steering angle command
26a target steering angle
26b target vehicle speed
31 automatic steering control unit
32 overheat protection current limit unit
33 statically-steerable number determination unit
34 motor control unit
35a statically-steerable upper limit number
35b parking possibility determination
36 EPS temperature detection means
41 steering angle information

The invention claimed is:

1. An electric power steering device comprising:
memory storing one or more instructions; and
at least one processor configured to execute the one or more instructions to:
  generate a route for driving from an own vehicle position to a target parking position;
  calculate a target steering angle command to control a steering angle in real time to travel along the route;
  calculate motor current for causing the steering angle to follow the target steering angle command, based on steering angle data acquired from a steering angle sensor;
  calculate a first overheat protection current limit value based on the motor current;
  calculate a target steering angle for each of a plurality of turnabouts along the route generated for driving from the own vehicle position to the target parking position;
  estimate a current amount required for each of the plurality of turnabouts based on a variation in the target steering angles;
  correct a predetermined estimated motor current amount per turnabout, based on the estimate current amount, to obtain a corrected estimated motor current amount;
  calculate a second overheat protection current limit value until completion of parking assistance along the generated route, based on the corrected estimated motor current amount and the first overheat protection current limit value;
  when the second overheat protection current limit value until the completion of the parking assistance is not greater than a predetermined statically-steerable determination current limit threshold, calculate a statically-steerable upper limit number, which is a maximum number of turnabouts permitted with static steering until the predetermined statically-steerable determination current limit threshold is reached, based on the first overheat protection current limit value and a predetermined estimated overheat protection current limit value variation amount per turnabout with static steering;
  generate an updated route for driving the own vehicle based on the statically-steerable upper limit number; and
  control the own vehicle to travel along the updated route.

2. The electric power steering device according to claim 1, wherein the first overheat protection current limit value represents a maximum current allowed to flow through a motor, and decreases based on the corrected estimated motor current amount, and
wherein the predetermined statically-steerable determination current limit threshold represents a minimum motor current value required to complete parking.

3. The electric power steering device according to claim 1, wherein
when the overheat protection current limit value until the completion of the parking assistance exceeds the predetermined statically-steerable determination current limit threshold, a determination result that steering is possible is outputted, and
when the overheat protection current limit value is not greater than the predetermined steerable determination current limit threshold, a determination result that steering is impossible is outputted.

4. The electric power steering device according to claim 1, wherein
the statically-steerable upper limit number is obtained through a map generated from a relationship between the overheat protection current limit value and the predetermined estimated overheat protection current limit value variation amount per turnabout with static steering.

5. The electric power steering device according to claim 1, wherein
an EPS temperature detected by an EPS temperature detector is used in calculation of the overheat protection current limit value.

6. The electric power steering device according to claim 3, wherein
an EPS temperature detected by an EPS temperature detector is used in calculation of the overheat protection current limit value.

7. The electric power steering device according to claim 4, wherein
an EPS temperature detected by an EPS temperature detector is used in calculation of the overheat protection current limit value.

* * * * *